(12) United States Patent
Taguchi

(10) Patent No.: US 11,577,836 B2
(45) Date of Patent: Feb. 14, 2023

(54) TOILET EXTERIOR STRUCTURE OF AIRCRAFT LAVATORY UNIT

(71) Applicant: The Yokohama Rubber Co., LTD., Tokyo (JP)

(72) Inventor: Yuji Taguchi, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 372 days.

(21) Appl. No.: 16/761,223

(22) PCT Filed: Jun. 29, 2018

(86) PCT No.: PCT/JP2018/024963
§ 371 (c)(1),
(2) Date: May 1, 2020

(87) PCT Pub. No.: WO2019/087461
PCT Pub. Date: May 19, 2019

(65) Prior Publication Data
US 2020/0354061 A1 Nov. 12, 2020

(30) Foreign Application Priority Data
Nov. 1, 2017 (JP) .............................. JP2017-211729

(51) Int. Cl.
*B64D 11/02* (2006.01)
*E03D 11/13* (2006.01)

(52) U.S. Cl.
CPC .............. *B64D 11/02* (2013.01); *E03D 11/13* (2013.01)

(58) Field of Classification Search
CPC ........... B64D 11/02; E03D 9/05; E03D 9/052; E03D 11/13
See application file for complete search history.

(56) References Cited

U.S. PATENT DOCUMENTS 1,955,579 A * 4/1934 De Malaussene ...... E03D 9/052
4/213
2,240,094 A * 4/1941 Foreman ................. E03D 9/052
4/217

(Continued)

FOREIGN PATENT DOCUMENTS

JP 2008-285835 11/2008
JP 2016-169004 9/2016
JP 2017-124819 7/2017

OTHER PUBLICATIONS

International Search Report for International Application No. PCT/JP2018/024963 dated Sep. 11, 2018, 4 pages, Japan.

(Continued)

*Primary Examiner* — J C Jacyna
(74) *Attorney, Agent, or Firm* — Thorpe North & Western

(57) ABSTRACT

Provided is a toilet exterior structure of an aircraft lavatory unit. A shroud mount in an upper end outer peripheral plate portion is provided in a lower surface of a main body plate portion. The shroud mount includes space portions extending in the width direction of the main body plate portion between partition walls provided in the main body plate portion. Where the body plate portion is placed in the upper end outer peripheral plate portion, a plurality of air communication passages communicating a space inside of the upper end outer peripheral plate portion in the width direction and a space outside of the upper end outer peripheral plate portion in the width direction are formed by the space portions. Where the main body plate portion is stepped on by a foot, the plurality of partition walls are positioned inside of a contour of the foot.

12 Claims, 13 Drawing Sheets

(56) References Cited

U.S. PATENT DOCUMENTS

| | | | |
|---|---|---|---|
| 4,376,314 A | 3/1983 | Iwans | |
| 5,839,127 A * | 11/1998 | Curiel | E03D 9/05 |
| | | | 4/216 |
| 6,226,807 B1 | 5/2001 | Rozenblatt et al. | |
| 7,065,801 B1 * | 6/2006 | Klepfer | E03D 9/05 |
| | | | 4/213 |
| 8,769,731 B2 | 7/2014 | Seibt | |
| 2004/0210994 A1 * | 10/2004 | Turkman | E03D 11/00 |
| | | | 4/216 |
| 2006/0277671 A1 * | 12/2006 | Jones | A47K 13/307 |
| | | | 4/217 |
| 2014/0137319 A1 | 5/2014 | Beach et al. | |
| 2014/0165279 A1 * | 6/2014 | Plugovoy | E03D 9/04 |
| | | | 4/348 |
| 2017/0150855 A1 | 6/2017 | Seibt et al. | |
| 2021/0169281 A1 * | 6/2021 | Taguchi | B64D 11/02 |
| 2021/0179270 A1 * | 6/2021 | Taguchi | A47K 13/28 |

OTHER PUBLICATIONS

European Search Report for European Application No. 18874875.0 dated Jun. 30, 2021, 9 pages, Germany.

* cited by examiner

TOILET EXTERIOR STRUCTURE OF AIRCRAFT LAVATORY UNIT

TECHNICAL FIELD

The present technology relates to a toilet exterior structure of an aircraft lavatory unit.

BACKGROUND ART

A toilet installed in an aircraft lavatory unit employs a method of discharging waste into a tank by negative pressure, and the shape of a toilet body significantly differs from the shape of a residential toilet body including a bowl portion. The toilet installed in an aircraft lavatory unit is made of metal or a resin and has a simple bowl shape.

Thus, in the toilet installed in an aircraft lavatory unit, the toilet body having a bowl shape is supported on the floor by a support portion, and further, an exterior (shroud) covering the toilet body and the support portion is provided.

The shroud includes an annular plate-like flange that is provided in a peripheral wall portion covering peripheries of the toilet body and the support portion and is provided in an upper portion of this peripheral wall portion, and that is placed in an upper end outer peripheral plate portion of the toilet body. A toilet seat is placed on this flange.

In the case of flushing to discharge waste, unless countermeasures are taken against negative pressure acting for the discharge, a human body seating portion in a state of sitting on the toilet seat may be drawn into the toilet body.

Thus, in an aircraft lavatory unit, a communication passage communicating the inside and the outside of the toilet body is required to be provided between the toilet seat and the upper end outer peripheral plate portion of the toilet body by a predetermined area or greater.

Accordingly, in an aircraft lavatory unit of the related art, a plurality of cushion blocks are provided in a lower surface of a toilet seat at intervals in the extension direction of the toilet seat while a plurality of cushion blocks are also provided in a lower surface of a flange of a shroud at intervals in the extension direction of the flange. A plurality of communication passages communicating the inside and the outside of a toilet body are provided between the cushion blocks between the lower surface of the toilet seat and the flange and between the lower surface of the flange and an upper end outer peripheral portion, and negative pressure of drawing into the toilet body is prevented from acting on the human body seating portion.

In recent years, the frequency of breakage of flanges of shrouds has increased.

It is considered that this is because a user of an aircraft lavatory unit puts their foot on the flange of the shroud while wearing shoes, or a user or a cleaning person stands on the flange of the shroud while wearing shoes.

As described above, in the aircraft lavatory unit, to prevent negative pressure from acting on the human body seating portion, the plurality of communication passages communicating the inside and the outside of the upper end outer peripheral plate portion of the toilet body are provided between the plurality of cushion blocks having a predetermined thickness between the flange and the upper end outer peripheral plate portion of the toilet body.

Thus, it has been considered that in a case where a user puts their foot or stands up between the cushion blocks adjacent to each other, or in other words, puts the foot or stands up at a section of the flange on the communication passages, the load may directly act on the flange and cause breakage of the flange.

SUMMARY

The present technology provides a toilet exterior structure of an aircraft lavatory unit that is advantageous in preventing negative pressure of drawing into a toilet body from acting on a human body seating portion, and preventing breakage of a flange of a shroud.

An embodiment of the present technology is a toilet exterior structure of an aircraft lavatory unit, including; a toilet body including a bowl portion and an upper end outer peripheral plate portion extending along an upper end outer periphery of the bowl portion with a width at an upper end of the bowl portion; a support portion configured to support the toilet body on a floor; a shroud including a flange placed in a peripheral wall portion covering peripheries of the toilet body and the support portion, and placed in the upper end outer peripheral plate portion; and a toilet seat placed on the flange. The flange includes a main body plate portion extending annularly along the upper end outer peripheral plate portion with a width larger than the width with which the upper end outer peripheral plate portion extends. A shroud mount placed in the upper end outer peripheral plate portion is provided in a lower surface facing downward of the main body plate portion. The shroud mount includes a plurality of space portions formed by a plurality of partition walls provided at intervals in a circumferential direction of the main body plate portion, and the plurality of space portions are opened downward between the plurality of partition walls and extend in a width direction of the main body plate portion. In a state where the main body plate portion is placed in the upper end outer peripheral plate portion via the plurality of partition walls, a plurality of air communication passages are formed by the plurality of space portions between the lower surface of the main body plate portion and the upper end outer peripheral plate portion, and communicate a space inside of the upper end outer peripheral plate portion in the width direction and a space outside of the upper end outer peripheral plate portion in the width direction. The intervals between the plurality of partition walls along the circumferential direction of the main body plate portion are formed with such a dimension that in a state where the main body plate portion is stepped on by a foot, the plurality of partition walls are positioned inside of a contour of the foot as viewed in a plan view.

According to an embodiment of the present technology, a space inside of the bowl portion is communicated with the inside of a lavatory by a plurality of air communication passages.

Thus, even when negative pressure in discharging waste acts on the inside of a toilet body, the negative pressure in discharging waste does not act on a human body seating portion.

In addition, even in a case where a user of an aircraft lavatory unit or a cleaning person steps on a main body plate portion of a flange of a shroud with a foot, a plurality of partition walls are positioned inside of a contour of the foot as viewed in a plan view, and the load can be received directly by the plurality of partition walls. Thus, this is advantageous in preventing breakage of the flange of the shroud.

BRIEF DESCRIPTION OF DRAWINGS

FIG. 7A is a cross-sectional view of a state where a flange of a shroud is placed in an upper end outer peripheral plate portion of a toilet body via the shroud mount; and FIG. 7B is a cross-sectional view taken along BB of FIG. 7A.

FIG. 8A is a cross-sectional view of a state where a flange of a shroud is placed in an upper end outer peripheral plate portion of a toilet body via the shroud mount; and FIG. 8B is a cross-sectional view taken along BB of FIG. 8A.

FIG. 9A is a cross-sectional view of a state where a flange of a shroud is placed in an upper end outer peripheral plate portion of a toilet body via the shroud mount; and FIG. 9B is a cross-sectional view taken along BB of FIG. 9A.

FIG. 10A is a cross-sectional view of a state where a flange of a shroud is placed in an upper end outer peripheral plate portion of a toilet body via the shroud mount; and FIG. 10B is a cross-sectional view taken along BB of FIG. 10A.

DETAILED DESCRIPTION

Hereinafter, embodiments of the present technology will be described with reference to the drawings.

Figure 1:
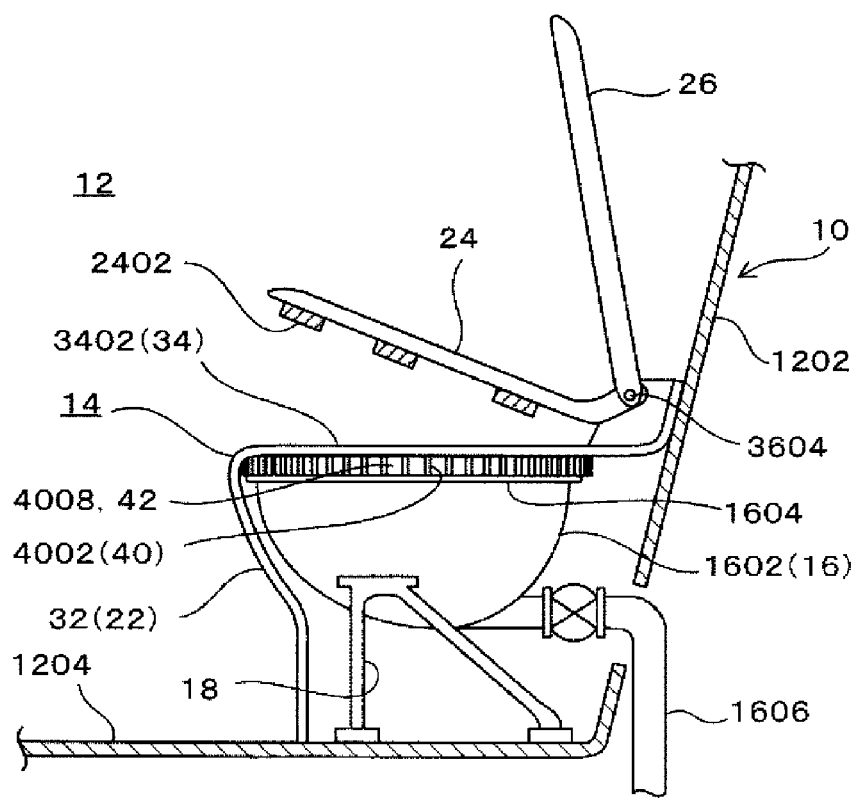
FIG. 1 is a side view of a toilet, and an explanatory view of the toilet without a part of a peripheral wall portion and an outer surface plate portion of a flange.
Figure 2:
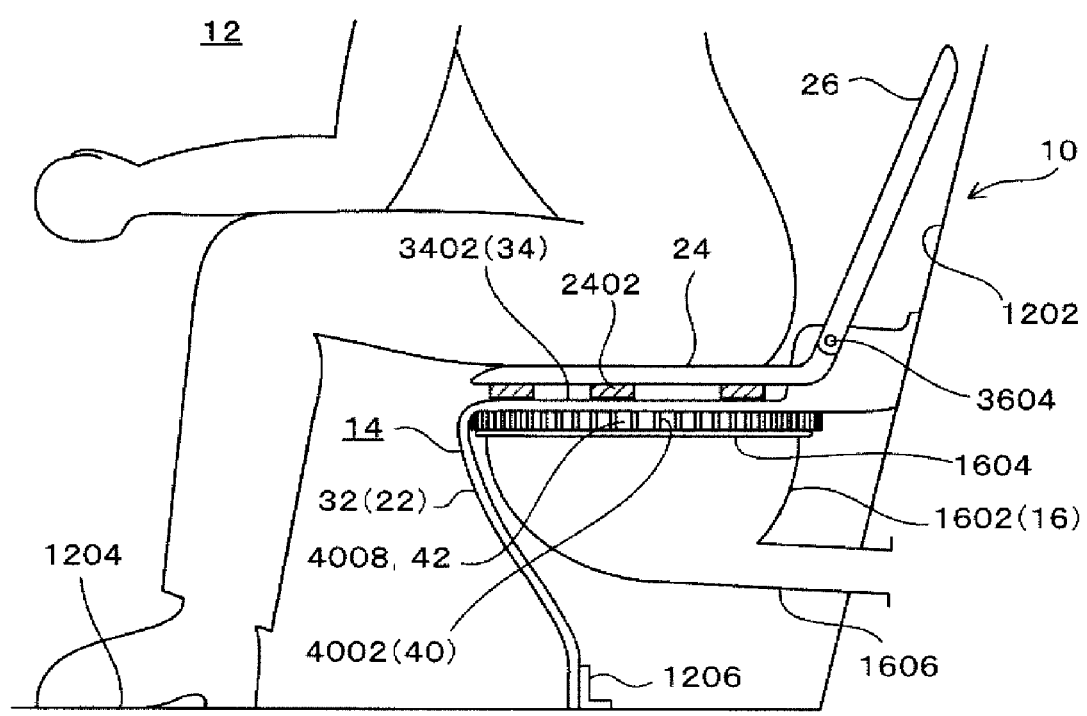
FIG. 2 is a side view of a toilet without a part of a peripheral wall portion and an outer surface plate portion of a flange, and is a view of a state where a user is sitting on a toilet seat.

As illustrated in FIGS. 1 and 2, a toilet 14 disposed in a lavatory 12 of an aircraft lavatory unit 10 includes a toilet body 16, a support portion 18, a shroud 22, a toilet seat 24, a lid 26, and a shroud mount 40.

The toilet body 16 is made of metal and includes a bowl portion 1602, and an upper end outer peripheral plate portion 1604 having an annular plate-like shape and extending outward of the bowl portion 1602 with a constant width W0 (see FIGS. 6A and 6B) along an upper end outer periphery of the bowl portion 1602 at an upper end of the bowl portion 1602.

A bottom portion of the bowl portion 1602 is connected to a discharge pipe 1606 that discharges waste in the bowl portion 1602 out of the bowl portion 1602 by negative pressure.

The support portion 18 supports the toilet body 16 on a floor 1204 of the lavatory 12, and in the present embodiment, supports the toilet body 16 at a section close to a rear wall 1202 of the lavatory 12.

Figure 4:
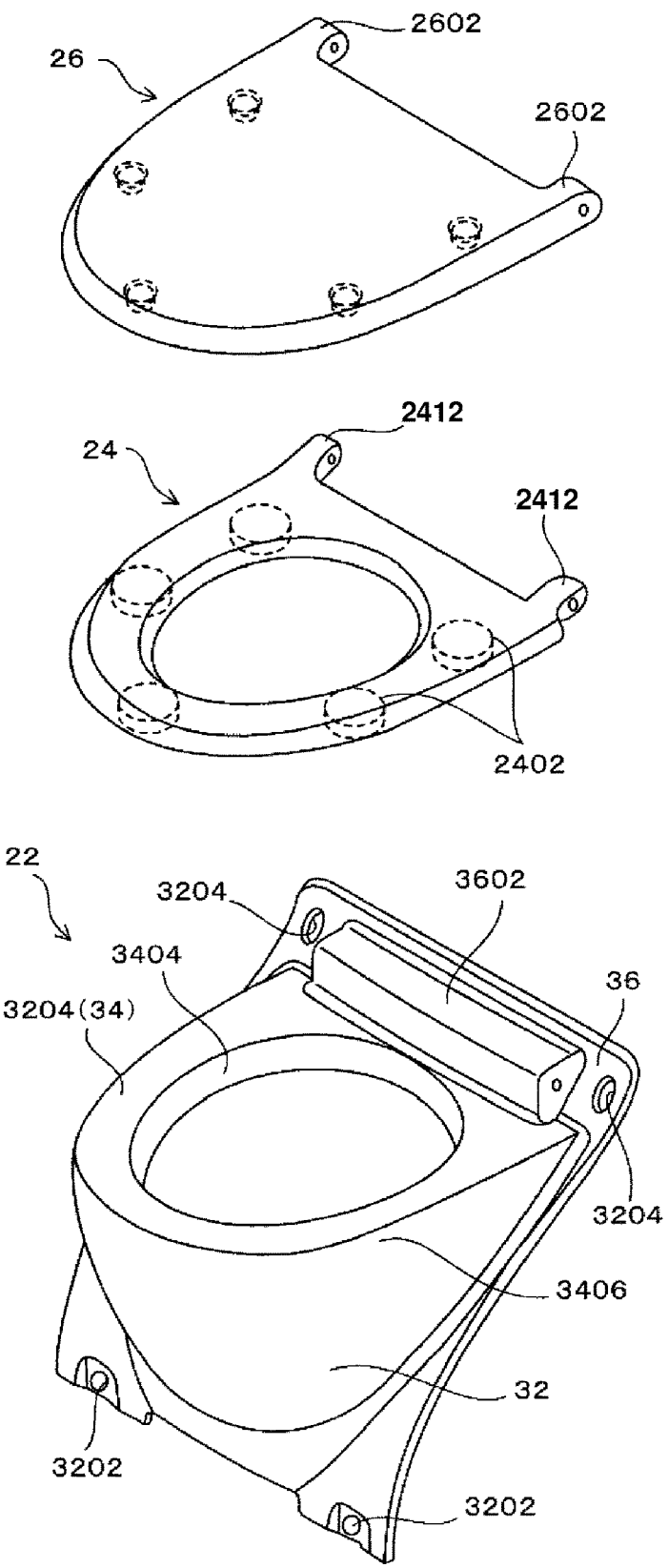
FIG. 4 is a perspective view of a lid, a toilet seat, and a shroud.

As illustrated in FIG. 4, the shroud 22 is made of a synthetic resin, and includes a peripheral wall portion 32 that covers peripheries of the toilet body 16 and the support portion 18, a flange 34 that is connected to an upper end of the peripheral wall portion 32 and placed in the upper end outer peripheral plate portion 1604, and an upper wall portion 36 that rises from a back end of the flange 34 positioned close to the rear wall 1202, and the upper wall portion 36 is provided with a mounting portion 3602 of the toilet seat 24 and the lid 26. The shroud 22 is installed in the lavatory 12 by attaching a lower end of the peripheral wall portion 32 to a mounting piece 1206 on the floor 1204 of the lavatory 12 by a bolt inserted into a bolt insertion hole 3202 in each of both sides of a lower end of the peripheral wall portion 32, and by attaching the upper wall portion 36 to the rear wall 1202 by a bolt inserted into the bolt insertion hole 3204 in each of both sides of the upper wall portion 36.

The toilet seat 24 and the lid 26 include forked portions 2412, 2602, respectively, and the forked portions 2412, 2602 each are attached in a swingable manner to the mounting portion 3602 via a support shaft 3604 (see FIGS. 1 and 2), and a plurality of cushion blocks 2402 placed in the flange 34 of the shroud 22 are attached to a lower surface of the toilet seat 24.

Figure 6A:
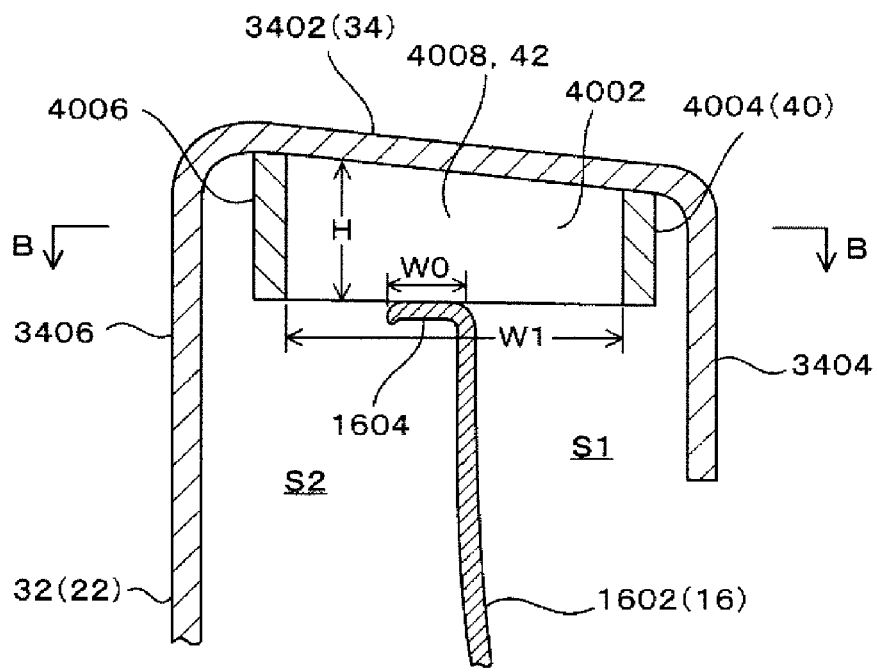
FIG. 6A is a cross-sectional view of a state where a flange of a shroud is placed in an upper end outer peripheral plate portion of a toilet body via a shroud mount.

As illustrated in FIGS. 4 and 6A, the flange 34 includes a main body plate portion 3402, an inner surface plate portion 3404, and an outer surface plate portion 3406.

The main body plate portion 3402 has a width larger than the width of the upper end outer peripheral plate portion 1604, and extends annularly along the extension direction (circumferential direction) of the upper end outer peripheral plate portion 1604.

The inner surface plate portion 3404 extends along the extension direction of the main body plate portion 3402 while projecting downward from an inner peripheral end of the main body plate portion 3402, and conceals the inside of the upper end outer peripheral plate portion 1604.

The outer surface plate portion 3406 extends along the extension direction of the main body plate portion 3402, projects downward from an outer peripheral end of the main body plate portion 3402, conceals the outside of the upper end outer peripheral plate portion 1604 and is connected to an upper portion of the peripheral wall portion 32.

The shroud mount 40 is made of a synthetic resin in the present embodiment. Note that the shroud mount 40 may be made of metal or hard rubber.

The shroud mount 40 is a separate member from the shroud 22 in the present embodiment.

As illustrated in FIGS. 5A to 5C and FIGS. 6A and 6B, the shroud mount 40 is provided at a section where the flange 34 is placed in the upper end outer peripheral plate portion 1604, and thus, the flange 34 is placed in the upper end outer peripheral plate portion 1604 via the shroud mount 40, or in other words, the shroud mount 40 is placed in the upper end outer peripheral plate portion 1604.

The shroud mount 40 includes a plurality of partition walls 4002, an inner peripheral wall 4004, an outer peripheral wall 4006, and a plurality of space portions 4008.

The partition walls 4002 linearly extend in the width direction of the main body plate portion 3402 at sections located at an equal interval in the extension direction of the main body plate portion 3402.

Figure 3:
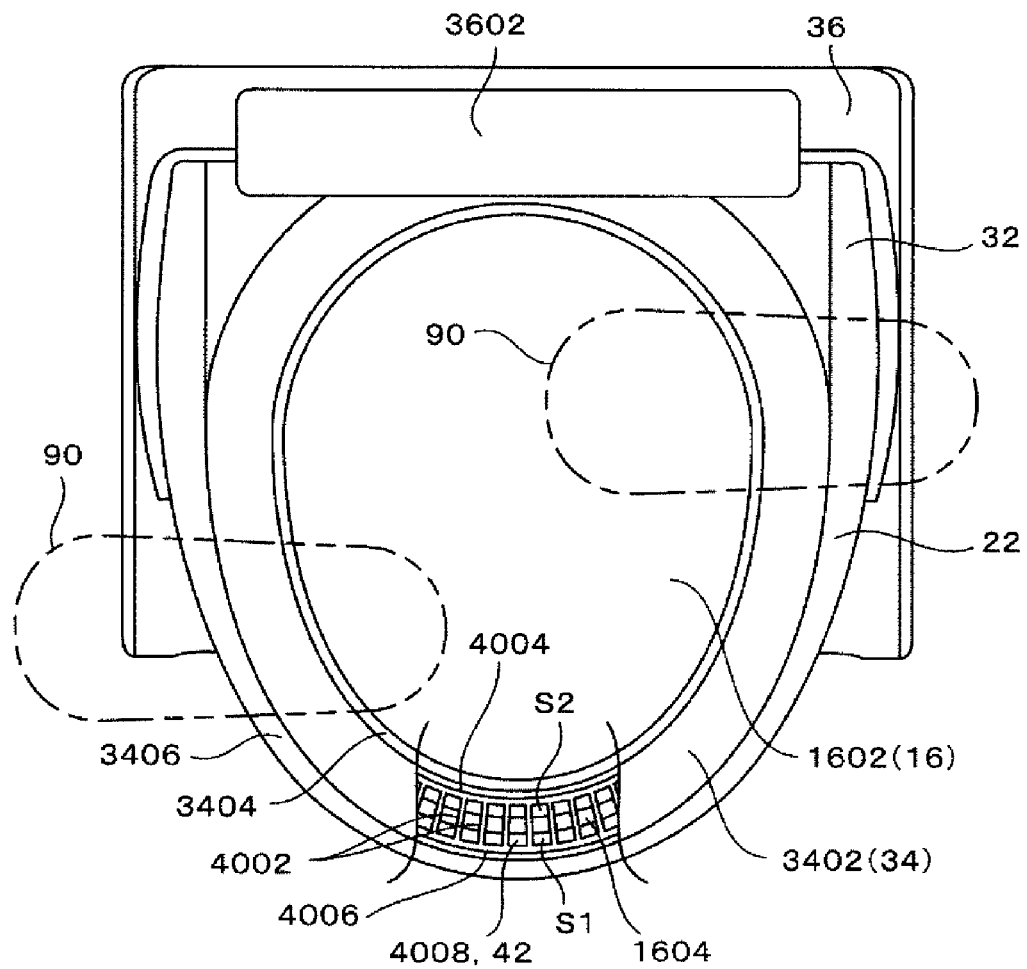
FIG. 3 is a cross-sectional plan view of an essential part of a toilet without a lid and a toilet seat.
Figure 5A:
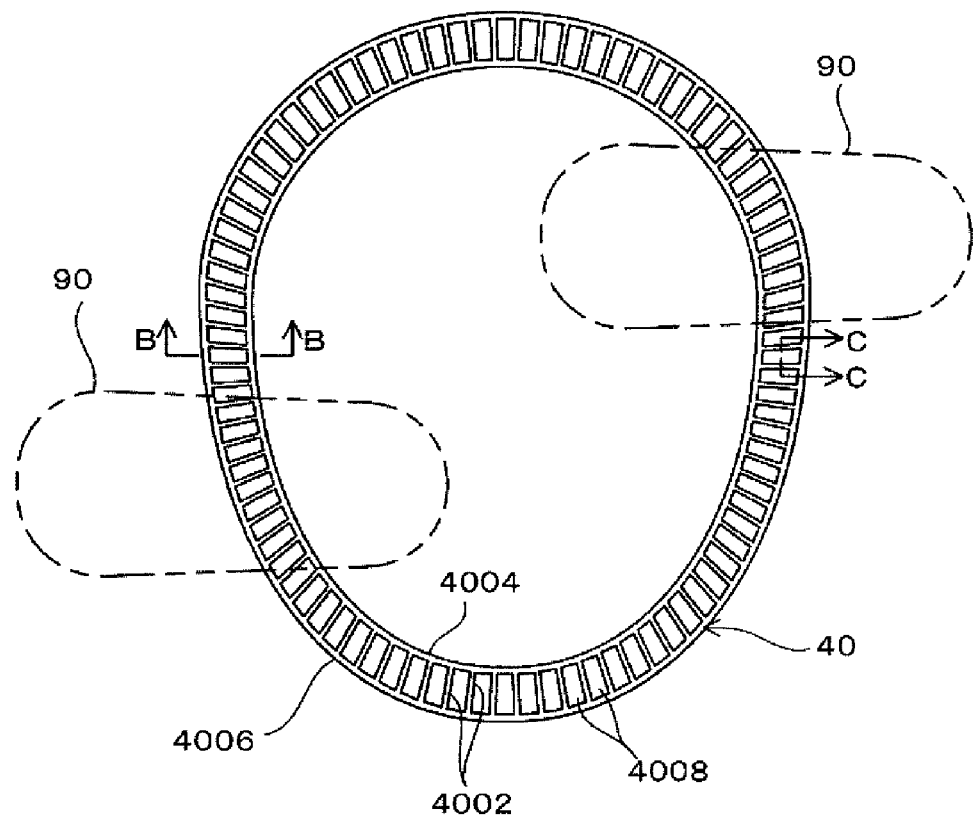
FIG. 5A is a plan view of a shroud mount.
Figure 5B:
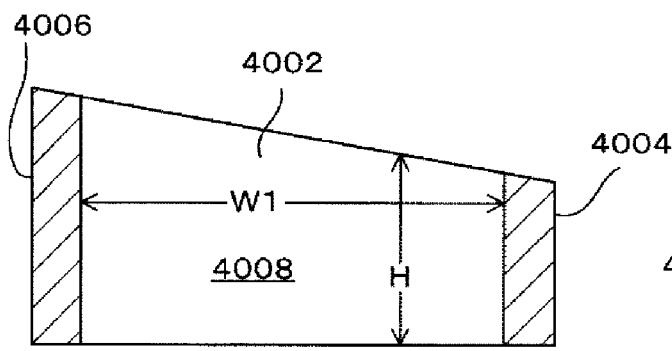
FIG. 5B is a cross-sectional view taken along BB of FIG. 5A.
Figure 5C:
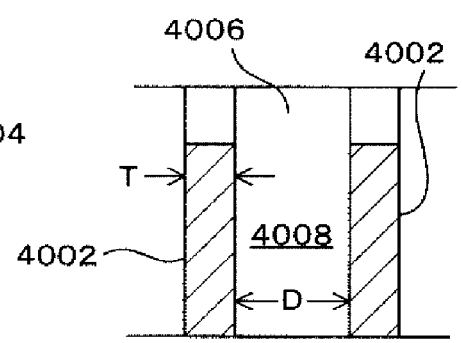
FIG. 5C is a cross-sectional view taken along CC of FIG. 5A.

As illustrated in FIGS. 3 and 5A, an interval D between the partition walls 4002 is such an interval that in a state where the main body plate portion 3402 is stepped on by a foot 90, the plurality of partition walls 4002 are positioned inside of a contour of the foot 90 as viewed in a plan view (in other words, a contour of a shoe 90).

As illustrated in FIGS. 5A to 5C, and FIGS. 6A and 6B, each one of the partition walls 4002 has a width W1 along the width direction of the main body plate portion 3402 that is orthogonal to the extension direction of the main body plate portion 3402, a height H along the thickness direction of the main body plate portion 3402, and a thickness T along the extension direction of the main body plate portion 3402.

In the present embodiment, the interval D between the partition walls 4002 is, for example, from 10 mm to 30 mm, and the thickness T of each one of the partition walls 4002 is from 3 mm to 6 mm.

The width W1 of each one of the partition walls 4002 is formed with a dimension greater than the width W0 of the upper end outer peripheral plate portion 1604, allowing for the partition walls 4002 to be reliably placed in the upper end outer peripheral plate portion 1604, and also allowing for the space portions 4008 and air communication passages 42 described below to span a space S1 inside of the upper end outer peripheral portion 1604 in the width direction and a space S2 outside of the upper end outer peripheral portion 1604 in the width direction.

Figure 6B:
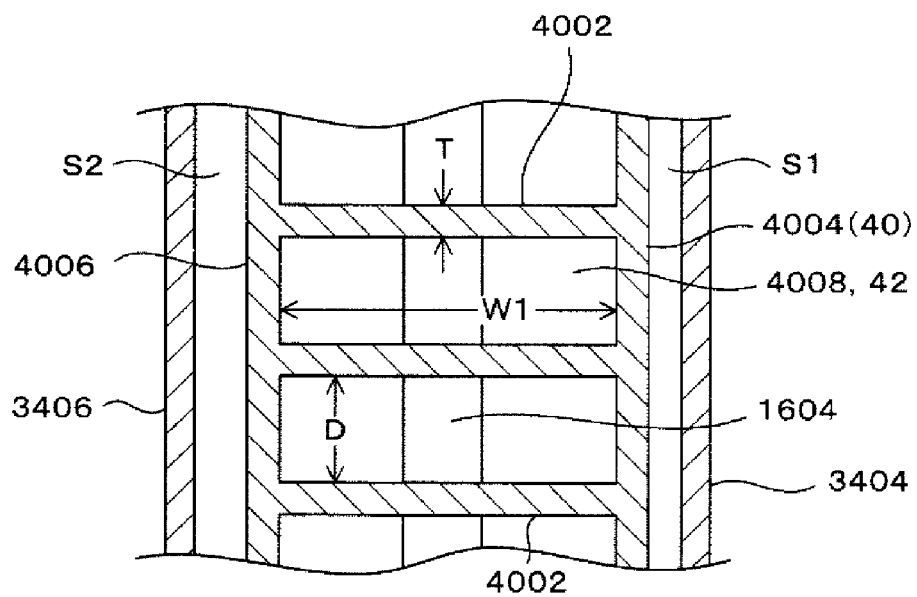
FIG. 6B is a cross-sectional view taken along BB of FIG. 6A.

As illustrated in FIG. 6B, in the present embodiment, in a state where the flange 34 is placed in the upper end outer peripheral plate portion 1604 via the shroud mount 40, the upper end outer peripheral plate portion 1604, is positioned in an intermediate portion in the width W1 direction of the partition walls 4002 as viewed in a plan view.

The height H of each one of the partition walls 4002 is formed such that the outer peripheral side is higher than the inner peripheral side, and that the height gradually increases from the inner periphery to the outer periphery, allowing for the space portions 4008 and the air communication passages 42 described below to be formed by a large cross-sectional area.

The thickness T of each one of the partition walls 4002 is formed with such a dimension that the rigidity of the partition walls 4002 is ensured, and in the present embodiment, the thickness of each one of the partition walls 4002 is uniform.

As illustrated in FIGS. 6A and 6B, the inner peripheral wall 4004 extends along the extension direction of the inner surface plate portion 3404 outside of the inner surface plate portion 3404, the outer peripheral wall 4006 extends along the extension direction of the outer surface plate portion 3406 inside of the outer surface plate portion 3406, and both ends in the extension direction of the partition walls 4002 are connected to the inner peripheral wall 4004 and the outer peripheral wall 4006.

In other words, the strength and the rigidity of the partition walls 4002 are ensured by the inner peripheral wall 4004 and the outer peripheral wall 4006.

Note that in the present embodiment, the shroud mount 40 is a separate member from the shroud 22, and is bonded to a lower surface of the main body plate portion 3402 with an adhesive.

In a state where the shroud mount 40 is attached to the lower surface of the main body plate portion 3402 of the flange 34, the plurality of space portions 4008 are formed in the shroud mount 40 by the plurality of partition walls 4002 provided at intervals in the circumferential direction of the main body plate portion 3402. The plurality of space portions 4008 each having a rectangular shape in a plan view, or in other words, a linear shape in the width direction of the main body plate portion 3402 are opened downward between the partition walls 4002 and extend in the width direction of the main body plate portion 3402.

Then, in a state where the main body plate portion 3402 is placed in the upper end outer peripheral plate portion 1604 via the plurality of partition walls 4002, the upper end outer peripheral plate portion 1604 is positioned in an intermediate portion in the longitudinal direction of the space portions 4008 as viewed in a plan view, and a plurality of the air communication passages 42 are formed by the space portions 4008 between the lower surface of the main body plate portion 3402 and the upper end outer peripheral plate portion 1604, and communicate the space S1 inside of the upper end outer peripheral plate portion 1604 in the width direction and the space S2 outside of the upper end outer peripheral plate portion 1604 in the width direction.

Thus, as illustrated in FIG. 6B, in a case where the air communication passages 42 are viewed in a plan view, the air communication passages 42 each have a linear shape elongated in the width direction of the main body plate portion 3402, and the upper end outer peripheral plate portion 1604 is positioned in an intermediate portion in the longitudinal direction of the air communication passages 42.

According to the present embodiment, in a state where the main body plate portion 3402 of the flange 34 is placed in the upper end outer peripheral plate portion 1604 via the plurality of partition walls 4002, the plurality of air communication passages 42 are formed between the lower surface of main body plate portion 3402 and the upper end outer peripheral plate portion 1604 by the space portions 4008, and communicate the space S1 inside of the upper end outer peripheral plate portion 1604 in the width direction and the space S2 outside of the upper end outer peripheral plate portion 1604 in the width direction.

In other words, a space inside of the bowl portion 1602 is communicated with the inside of the lavatory 12 via the plurality of air communication passages 42.

Thus, even when negative pressure in discharging waste acts on the inside of the toilet body 16, the negative pressure in discharging waste does not act on the human body seating portion.

In addition, as illustrated in FIGS. 3 and 5A, even in a case where a user of the aircraft lavatory unit 10 put a foot on the flange 34 of the shroud 22, or even in a case where a user or a cleaning person stands up on the flange 34 of the shroud 22 while wearing the shoe 90, or in other words, even in a case where the main body plate portion 3402 of the flange 34 is stepped on by a foot, the plurality of partition walls 4002 are positioned inside of the contour of the foot (in other words, the contour of the shoe 90) as viewed in a plan view, and the load can be received directly by the plurality of partition walls 4002. Thus, this is advantageous in preventing breakage of the flange 34 of the shroud 22.

In addition, a cushion rubber of the related art is removed from a lower surface of the flange 34, and the shroud mount 40 is attached to the lower surface of the flange 34, and thus it is possible to also correspond to a toilet 14 used in the related art, and excellent versatility is provided.

In this case, it is more advantageous to form the partition walls 4002 each having the same height as the dimension of a cushion block of the related art.

Note that in the present embodiment, the case where the shroud mount 40 is a separate member from the shroud 22 and is bonded to the lower surface of the main body plate portion 3402 with an adhesive is described; however, the shroud mount 40 may be formed integrally with the shroud 22. This is advantageous in reducing the number of components and reducing the number of assembly steps.

Figure 7A:
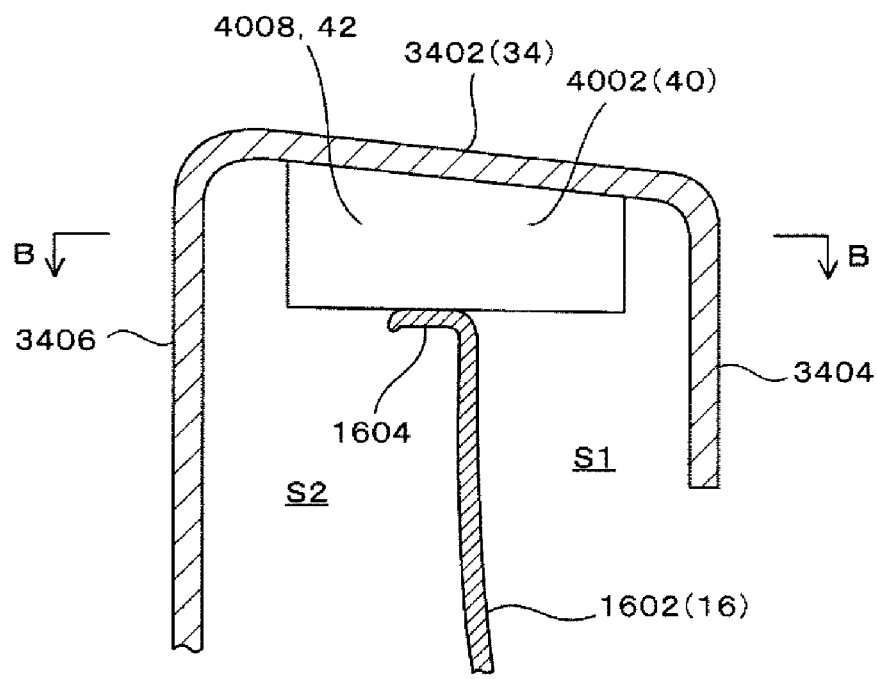
FIGS. 7A and 7B are explanatory views of a modified example of a shroud mount.
Figure 7B:
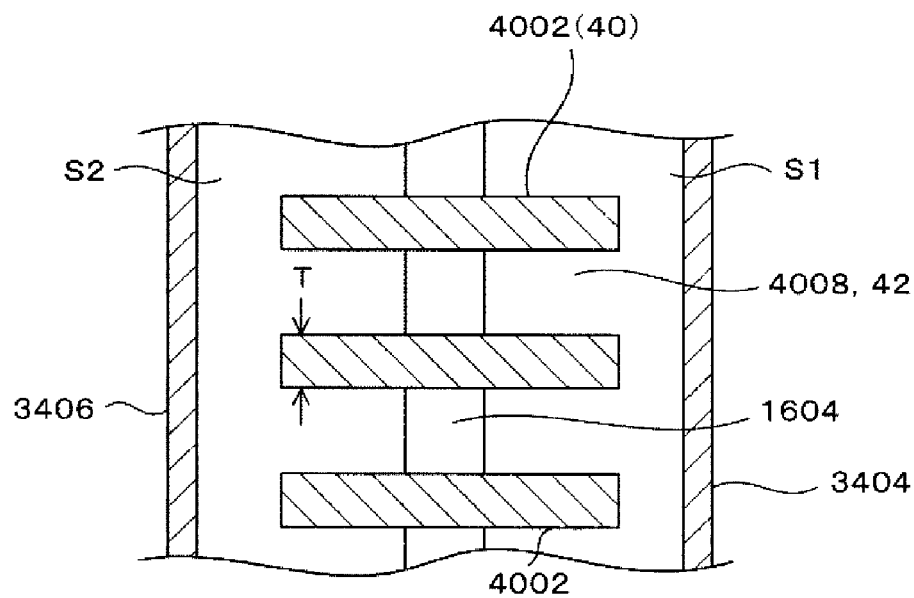

As illustrated in FIGS. 7A and 7B, in a case where the shroud mount 40 is formed integrally with the shroud 22, when the rigidity of the partition walls 4002 is increased by increasing the thickness T of each one of the partition walls 4002, the inner peripheral wall 4004 and the outer peripheral wall 4006 can be omitted.

Figure 8A:
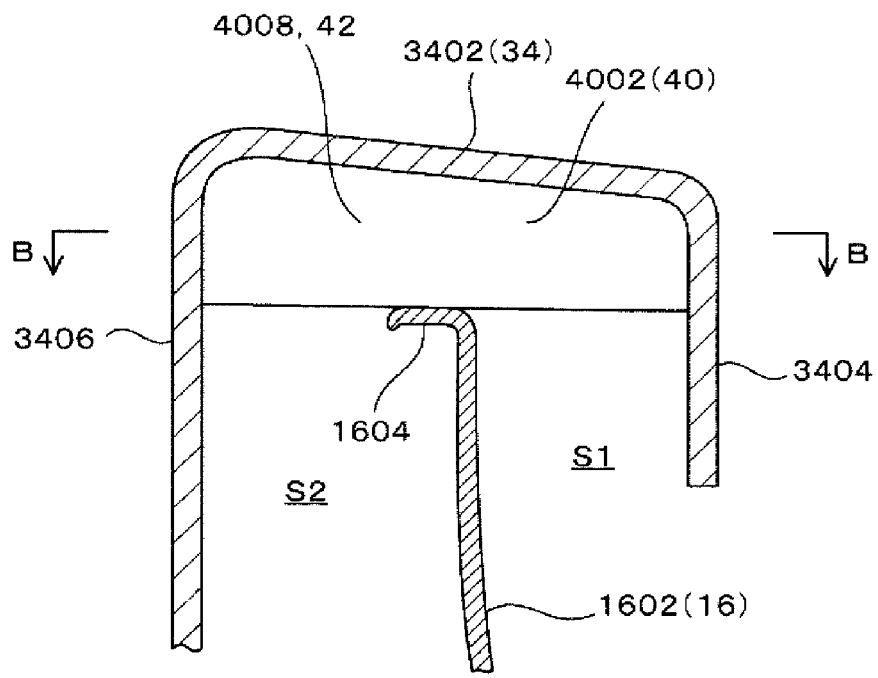
FIGS. 8A and 8B are explanatory views of a modified example of a shroud mount.
Figure 8B:
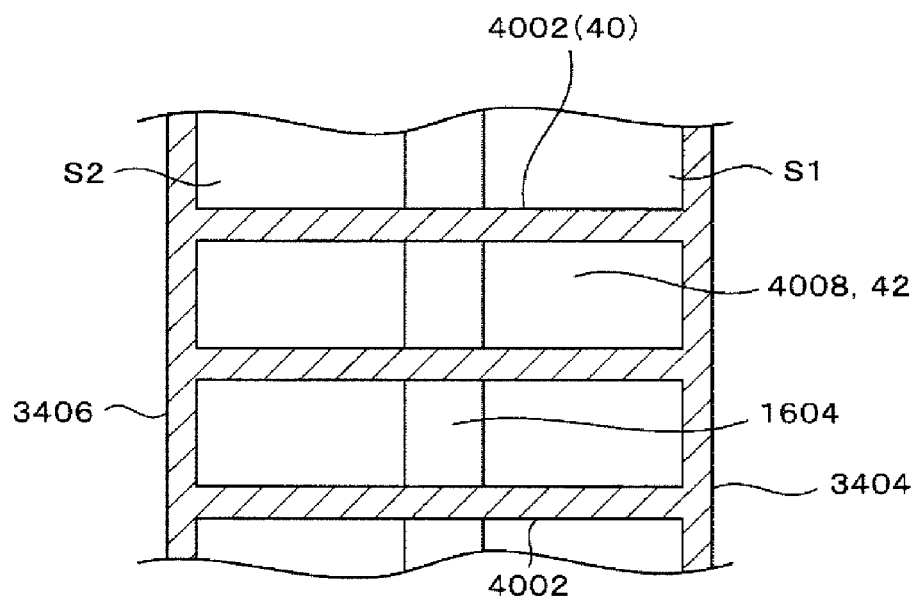
Figure 9A:
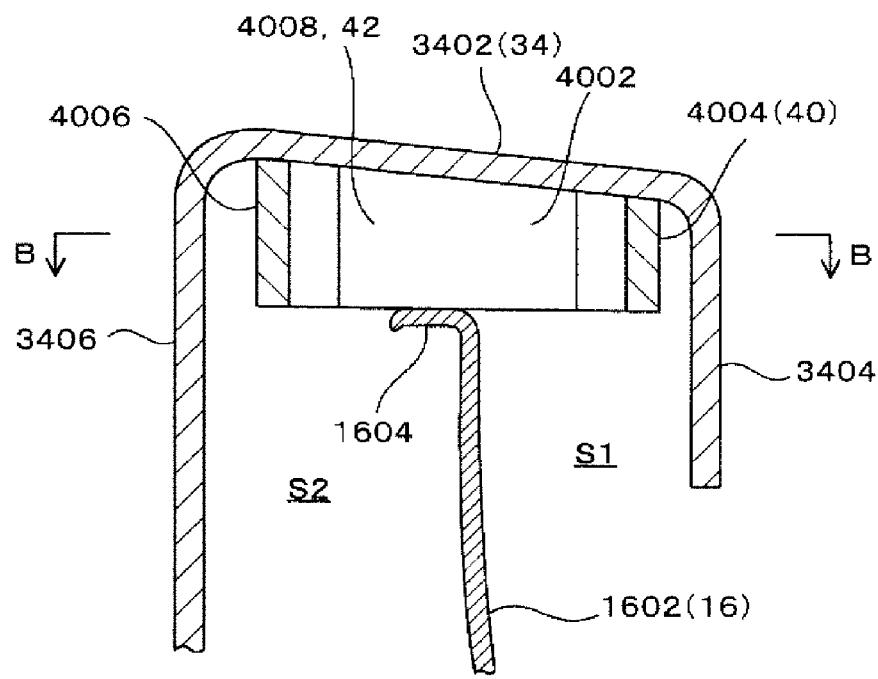
FIGS. 9A and 9B are explanatory views of a modified example of a shroud mount.
Figure 9B:
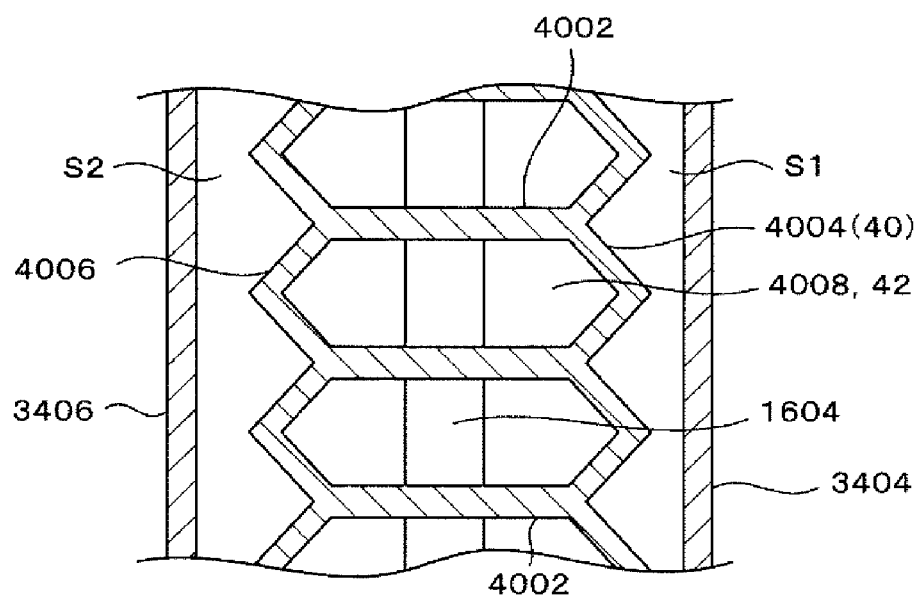
Figure 10A:
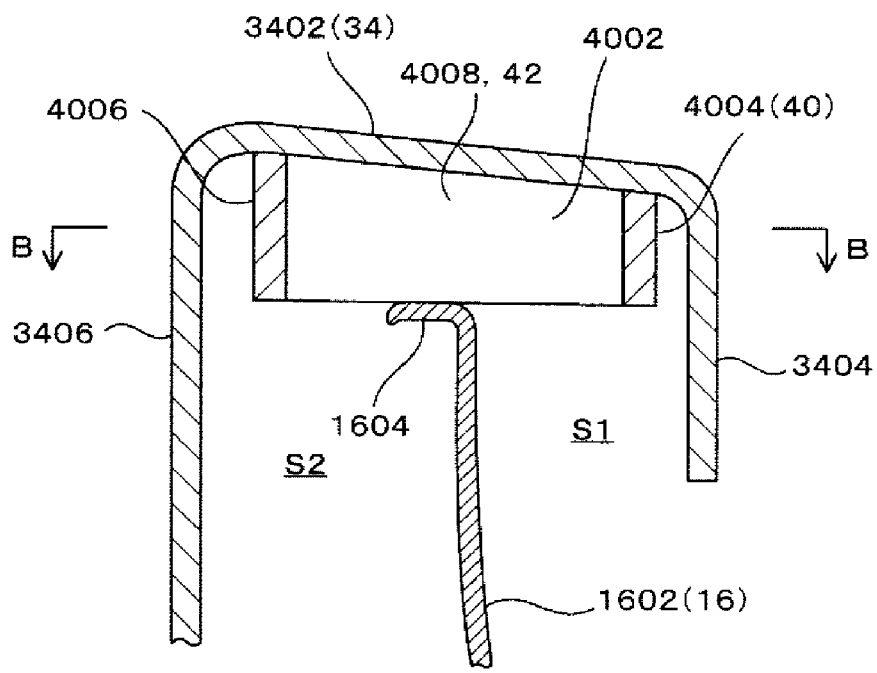
FIGS. 10A and 10B are explanatory views of a modified example of a shroud mount.
Figure 10B:
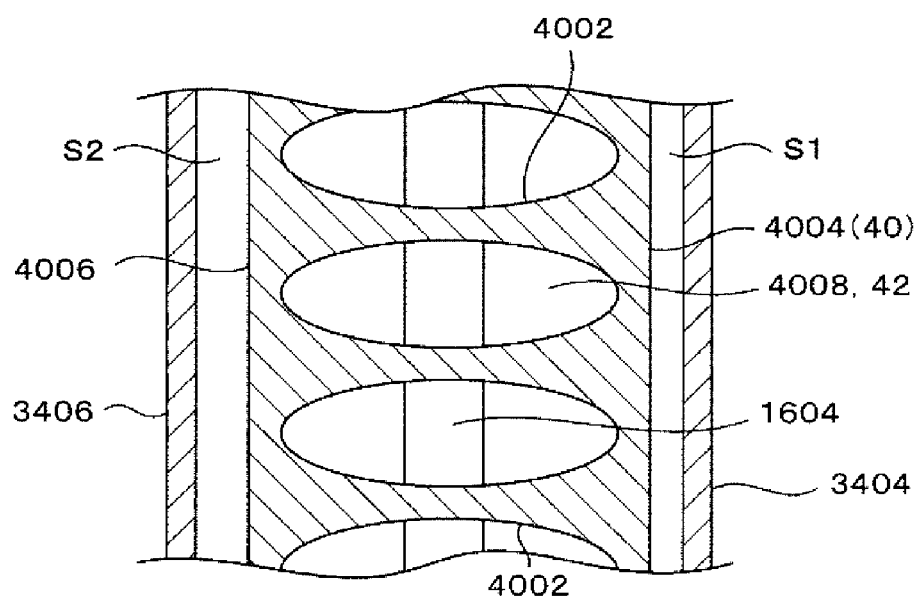

In addition, as illustrated in FIGS. 8A and 8B, in a case where the shroud mount 40 is formed integrally with the shroud 22, to ensure the rigidity of the partition walls 4002, both ends in the extension direction of the partition walls 4002 may be connected to the inner surface plate portion 3404 and the outer surface plate portion 3406, respectively. Similarly, in that case, the inner peripheral wall 4004 and the outer peripheral wall 4006 are unnecessary.

In addition, in the present embodiment, the case where the space portions 4008 and the air communication passages 42 each have a substantially rectangular shape is described; however, regardless of whether the shroud mount 40 is separate from or formed integrally with the shroud 22, as illustrated in FIGS. 9A and 9B and FIGS. 10A and 10B, the space portions 4008 and the air communication passages 42 may each have a hexagonal shape, an elliptical shape, or the like as viewed in a plan view, and various shapes known in the related art can be applied to the shapes of the space portions 4008 and the air communication passages 42. The shapes of the partition walls 4002 are appropriately determined according to the shapes of the space portions 4008 and the air communication passages 42.

Figure 11:
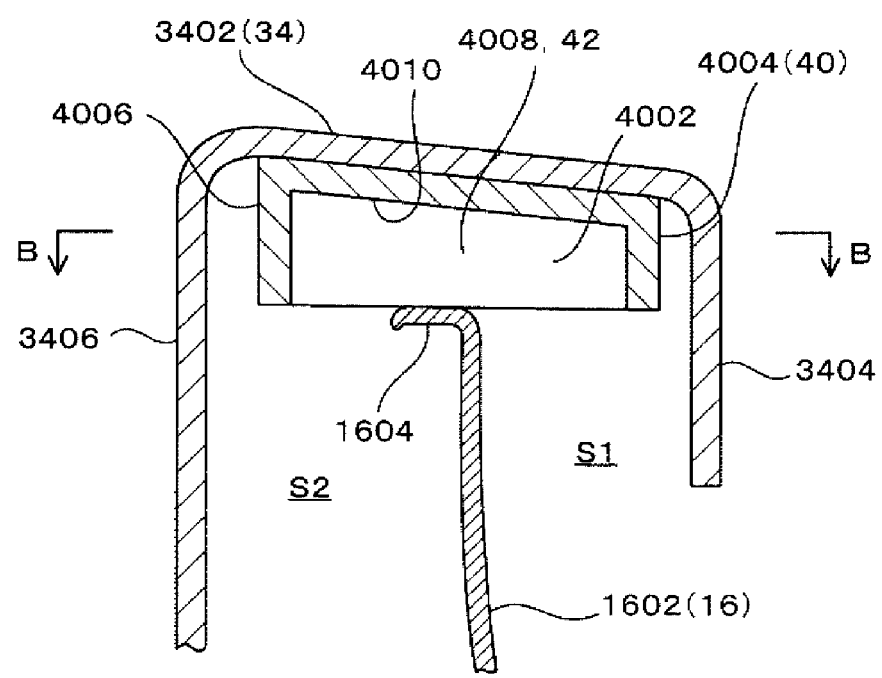
FIG. 11 is an explanatory view of another modified example of a shroud mount, and is a cross-sectional view of a state where a flange of a shroud is placed in an upper end outer peripheral plate portion of a toilet body via the shroud mount.

In addition, as illustrated in FIG. 11, the shroud mount 40 may include, in addition to the partition walls 4002, the inner peripheral wall 4004, and the outer peripheral wall 4006, a bottom wall 4010 that connects the partition walls 4002, the inner peripheral wall 4004, and the outer peripheral wall 4006. In this embodiment, the space portions 4008 are formed to penetrate in the height direction of the partition walls 4002; however, when the bottom wall 4010 is provided, the space portions 4008 are each formed by the bottom wall 4010 as a recessed portion that is opened downward, and the strength and the rigidity of the partition walls 4002 are ensured by the bottom wall 4010.

Figure 12:
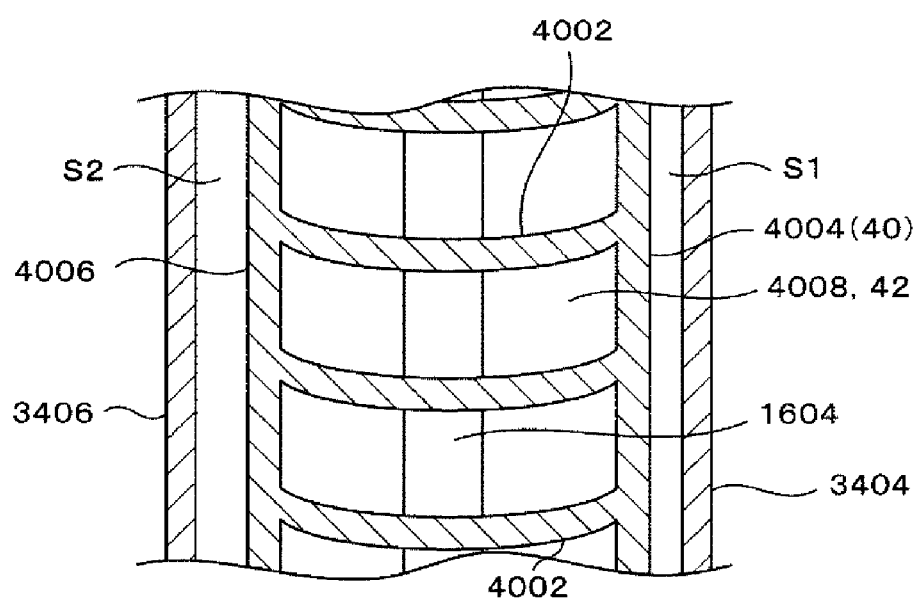
FIG. 12 is an explanatory view of a modified example of a partition wall, and is a view corresponding to the cross section taken along BB of FIG. 6B.
Figure 13:
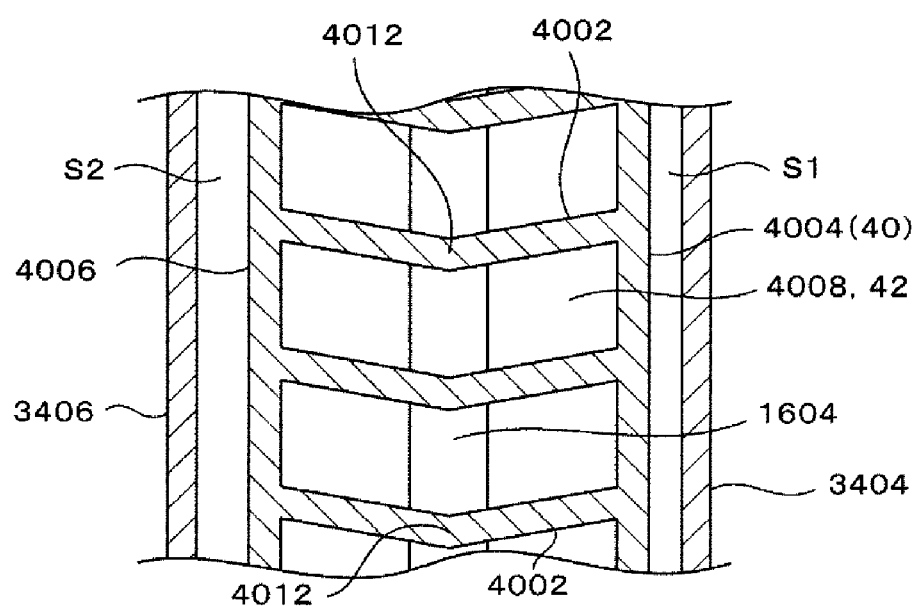
FIG. 13 is an explanatory view of a modified example of a partition wall, and is a view corresponding to the cross section taken along BB of FIG. 6B.

In addition, in the present embodiment, the case where the partition walls 4002 extend linearly in the width direction of the main body plate portion 3402 is described; however, regardless of whether the shroud mount 40 is separate from or formed integrally with the shroud 22, as illustrated in FIG. 12, the partition walls 4002 curvilinearly extend, or as illustrated in FIG. 13, the partition walls 4002 extend being bent. The partition walls 4002 extend in any shape, in short, the partition walls 4002 may have any shape as long as the partition walls 4002 receive a load applied to the flange 34, for example, when a user puts the foot on the flange 34, and as long as the space portions 4008 and the air communication passages 42 are formed.

Note that, as illustrated in FIG. 12, in a case where the partition walls 4002 each extend curvilinearly as a protrusion in the circumferential direction of the body plate portion 3402, or, as illustrated in FIG. 13, when the partition walls 4002 extend being bent and bent portions 4012 of the partition walls 4002 are positioned on the upper end outer peripheral plate portion 1604, the area of contact of the partition walls 4002 with the upper end outer peripheral plate portion 1604 can be increased without changing the area of the air communication passages 42, and this is advantageous in increasing the durability of the partition walls 4002, or in other words, the durability of the shroud mount 40.

The invention claimed is:

1. A toilet exterior structure of an aircraft lavatory unit, comprising:
    a toilet body comprising a bowl portion and an upper end outer peripheral plate portion extending along an upper end outer periphery of the bowl portion with a width at an upper end of the bowl portion;
    a support portion configured to support the toilet body on a floor;
    a shroud comprising a flange placed in a peripheral wall portion covering peripheries of the toilet body and the support portion, and placed in the upper end outer peripheral plate portion; and
    a toilet seat placed on the flange;
    the flange comprising a main body plate portion extending annularly along the upper end outer peripheral plate portion with a width larger than the width with which the upper end outer peripheral plate portion extends;
    a shroud mount being placed in the upper end outer peripheral plate portion and being provided in a lower surface facing downward of the main body plate portion;
    the shroud mount comprising a plurality of space portions formed by a plurality of partition walls provided at intervals in a circumferential direction of the main body plate portion, and the plurality of space portions being opened downward between the plurality of partition walls and extending in a width direction of the main body plate portion; and
    in a state where the main body plate portion is placed in the upper end outer peripheral plate portion via the plurality of partition walls, a plurality of air communication passages being formed by the plurality of space portions between the lower surface of the main body plate portion and the upper end outer peripheral plate portion, and communicating a space inside of the upper end outer peripheral plate portion in the width direction and a space outside of the upper end outer peripheral plate portion in the width direction.

2. The toilet exterior structure of an aircraft lavatory unit according to claim 1, wherein
    the main body plate portion has a width orthogonal to an extension direction of the main body plate portion;
    the plurality of partition walls extend in a width direction of the main body plate portion; and
    as viewed in a plan view, the upper end outer peripheral plate portion is positioned in an intermediate portion in an extension direction of the plurality of partition walls.

3. The toilet exterior structure of an aircraft lavatory unit according to claim 1, wherein
    the shroud mount, in addition to the plurality of partition walls, comprises an inner peripheral wall extending along an inner peripheral end of the main body plate portion at a section close to the inner peripheral end, and an outer peripheral wall extending along an extension direction of an outer peripheral end of the main body plate portion at a section close to the outer peripheral end;
    the plurality of partition walls extend in the width direction of the main body plate portion, and both ends in the extension direction of the plurality of partition walls are connected to the inner peripheral wall and the outer peripheral wall; and the shroud mount is separate from the shroud and is attached to a lower surface of the flange with an adhesive.

4. The toilet exterior structure of an aircraft lavatory unit according to claim 1, wherein the shroud mount is integrally formed with the shroud; and the plurality of partition walls project from the lower surface of the main body plate portion.

5. The toilet exterior structure of an aircraft lavatory unit according to claim 1, wherein the shroud mount is integrally formed with the shroud;

the plurality of partition walls project from the lower surface of the main body plate portion;

the flange, in addition to the main body plate portion, comprises: an inner surface plate portion extending along the extension direction of the main body plate portion while projecting downward from an inner peripheral end of the main body plate portion, and concealing an inside of the upper end outer peripheral plate portion; and an outer surface plate portion projecting downward from an outer peripheral end of the main body plate portion, extending along the extension direction of the main body plate portion, concealing an outside of the upper end outer peripheral plate portion, and connected to the peripheral wall portion; and the plurality of partition walls extend in the width direction of the main body plate portion, and both ends in the extension direction of the plurality of partition walls are connected to the inner surface plate portion and the outer surface plate portion.

6. The toilet exterior structure of an aircraft lavatory unit according to claim 1, wherein the plurality of partition walls each extend curvilinearly as a protrusion in the circumferential direction of the main body plate portion.

7. The toilet exterior structure of an aircraft lavatory unit according to claim 1, wherein the plurality of partition walls each comprise a bent portion in an intermediate portion in the extension direction of the plurality of partition walls, and the bent portion is placed on the upper end outer peripheral plate portion.

8. The toilet exterior structure of an aircraft lavatory unit according to claim 2, wherein the shroud mount, in addition to the plurality of partition walls, comprises an inner peripheral wall extending along an inner peripheral end of the main body plate portion at a section close to the inner peripheral end, and an outer peripheral wall extending along an extension direction of an outer peripheral end of the main body plate portion at a section close to the outer peripheral end;

the plurality of partition walls extend in the width direction of the main body plate portion, and both ends in the extension direction of the plurality of partition walls are connected to the inner peripheral wall and the outer peripheral wall; and the shroud mount is separate from the shroud and is attached to a lower surface of the flange with an adhesive.

9. The toilet exterior structure of an aircraft lavatory unit according to claim 8, wherein the shroud mount is integrally formed with the shroud; and the plurality of partition walls project from the lower surface of the main body plate portion.

10. The toilet exterior structure of an aircraft lavatory unit according to claim 2, wherein the shroud mount is integrally formed with the shroud;

the plurality of partition walls project from the lower surface of the main body plate portion;

the flange, in addition to the main body plate portion, comprises: an inner surface plate portion extending along the extension direction of the main body plate portion while projecting downward from an inner peripheral end of the main body plate portion, and concealing an inside of the upper end outer peripheral plate portion; and an outer surface plate portion projecting downward from an outer peripheral end of the main body plate portion, extending along the extension direction of the main body plate portion, concealing an outside of the upper end outer peripheral plate portion, and connected to the peripheral wall portion; and the plurality of partition walls extend in the width direction of the main body plate portion, and both ends in the extension direction of the plurality of partition walls are connected to the inner surface plate portion and the outer surface plate portion.

11. The toilet exterior structure of an aircraft lavatory unit according to claim 10, wherein the plurality of partition walls each extend curvilinearly as a protrusion in the circumferential direction of the main body plate portion.

12. The toilet exterior structure of an aircraft lavatory unit according to claim 10, wherein the plurality of partition walls each comprise a bent portion in an intermediate portion in the extension direction of the plurality of partition walls, and the bent portion is placed on the upper end outer peripheral plate portion.

* * * * *